United States Patent [19]
Lewis et al.

[11] Patent Number: 5,961,862
[45] Date of Patent: *Oct. 5, 1999

[54] DEPOSITION HEAD FOR LASER

[75] Inventors: Gary K. Lewis; Richard M. Less, both of Los Alamos, N.Mex.

[73] Assignee: The Regents of the University of California, Los Alamos, N.Mex.

[*] Notice: This patent issued on a continued prosecution application filed under 37 CFR 1.53(d), and is subject to the twenty year patent term provisions of 35 U.S.C. 154(a)(2).

[21] Appl. No.: 08/565,798

[22] Filed: Nov. 30, 1995

[51] Int. Cl.$^6$ .......................... B23K 26/14; B23K 26/00
[52] U.S. Cl. ............................ 219/121.84; 219/121.63
[58] Field of Search .......................... 219/121.6, 121.63, 219/121.64, 121.65, 121.66, 121.84, 121.75, 121.47; 118/620, 300, 302; 264/497; 427/596, 597; 239/79, 80, 85; 419/1, 2

[56] References Cited

U.S. PATENT DOCUMENTS

| | | |
|---|---|---|
| 4,323,756 | 4/1982 | Brown et al. . |
| 4,724,299 | 2/1988 | Hammeke . |
| 4,743,733 | 5/1988 | Mehta . |
| 5,043,548 | 8/1991 | Whitney et al. ............... 219/121.47 |
| 5,111,021 | 5/1992 | Jolys et al. .................... 219/121.6 |
| 5,182,430 | 1/1993 | Lagain .......................... 219/121.63 |
| 5,321,228 | 6/1994 | Krause et al. ................. 219/121.84 |
| 5,418,350 | 5/1995 | Freneaus et al. .............. 219/121.63 |
| 5,449,536 | 9/1995 | Funkhouser et al. .......... 427/597 |
| 5,477,026 | 12/1995 | Buongiorno .................. 219/121.84 |
| 5,647,931 | 7/1997 | Retallick et al. . |

FOREIGN PATENT DOCUMENTS

| | | | |
|---|---|---|---|
| 0 490 146 A2 | 11/1991 | European Pat. Off. . | |
| 2326296 | 12/1974 | Germany ........................ | 219/121.84 |
| 60-49886 | 3/1985 | Japan ............................... | 219/121.84 |
| 61-169186 | 7/1986 | Japan ............................... | 219/121.84 |
| 4-84684 | 3/1992 | Japan ............................... | 219/121.63 |
| 2 227 964 | 8/1990 | United Kingdom . | |
| 2227964 | 8/1990 | United Kingdom ............ | 219/121.84 |

OTHER PUBLICATIONS

Keicher, D.M. and John E. Smugeresky, "Overview: The Laser Forming of Metallic Components Using Particulate Materials," *JOM*, vol. 49, No. 5, May 1997.

Mazumder, J., J. Choi, K. Nagarathnam, J. Koch, and D. Hetzner, "Research Summary: The Direct Metal Deposition of H13 Tool Steel for 3–D Components," *JOM*, vol. 49, No. 5, May 1997.

Lewis, Gary K. (editor), "Directed Light Fabrication," Los Alamos National Laboratory, Jun. 1996.

*Primary Examiner*—Gregory L. Mills
*Attorney, Agent, or Firm*—Gemma Morrison Bennett

[57] ABSTRACT

A deposition head for use as a part of apparatus for forming articles from materials in particulate form in which the materials are melted by a laser beam and deposited at points along a tool path to form an article of the desired shape and dimensions. The deposition head delivers the laser beam and powder to a deposition zone, which is formed at the tip of the deposition head. A controller comprised of a digital computer directs movement of the deposition zone along the tool path and provides control signals to adjust apparatus functions, such as the speed at which the deposition head moves along the tool path.

7 Claims, 13 Drawing Sheets

DEPOSITION HEAD FOR LASER

This invention was made with government support under Contract No. W-7405-ENG-36 awarded by the U.S. Department of Energy. The government has certain rights in the invention.

FIELD OF THE INVENTION

This invention relates to the field of fabrication of articles and, more particularly, to production of objects using particulate matter, or powder, as a starting material.

BACKGROUND OF THE INVENTION

This invention is a deposition head which is useful in the process which is termed directed light fabrication (DLF) or the DLF process. Directed light fabrication may be used to produce articles of any material which is obtainable in the form of a powder, but its primary use is expected to be production of metal articles.

Metal objects are currently produced by thermomechanical processes which include casting, rolling, stamping, forging, extrusion, machining, and joining operations. Multiple steps are required to produce a finished article. These conventional operations often require the use of heavy equipment and molds, tools, and dies. For example, a typical process sequence required to form a small cylindrical pressure vessel might include casting an ingot, heat treating and working the casting to homogenize it by forging or extrusion or both, then machining a hollow cylinder and, separately, end caps from the worked ingot and, finally, welding the end caps to the cylinder. The DLF process provides a method for forming such an article in a single operation and using less equipment. An article formed by laser deposition is relatively free of internal stresses in comparison to an article formed by welding one or more components together. Also, joining components by means of welding requires equipment just for the single step of joining and time to set up the equipment to do the job.

Conventional production methods are subtractive in nature in that material is cut away from a starting block of material to produce a more complex shape. Subtractive machining methods are deficient in many respects. Large portions of the starting material are reduced to waste in the form of cuttings. These methods produce waste materials, such as metal cuttings, oils, and solvents, which must be further processed for purposes of reuse or disposal. The articles produced are contaminated with cutting fluids and metal chips. They require cutting tools which wear and must be periodically reconditioned and ultimately replaced. Fixtures for use in manufacturing must be designed, fabricated, and manipulated during production. When a part is unusual in shape or has internal features, machining is more difficult. Choosing the machining operations to be used and the sequence of operations requires a high degree of experience. A number of different machines are needed to provide capability to perform the variety of operations which are often required to produce a single article. Sophisticated machine tools require a significant capital investment and occupy a good deal of space. Use of DLF in place of subtractive machining provides solutions to these problems and disadvantages. The DLF process may be characterized as additive in nature. The raw material which does not become part of an article is easily collected and re-used without processing. There is no need to dispose of waste liquids and metal cuttings and the articles produced are not contaminated by these materials. Fixtures and cutting tools are not required. All work needed to produce an article is accomplished using a computer workstation and a single production station. Also, this invention can be used to rapidly provide production tooling after article design is frozen.

Another difficulty with conventional machining techniques is that many objects must be produced by machining a number of parts and then joining them together. Producing parts separately and joining them requires close-tolerance machining of matching parts, provision of fastening means, such as threaded connections, and welding together of components. These operations involve a significant portion of the cost of producing an article, as they require time for design and production as well as apparatus for performing them.

The process of designing an article for volume production often consumes a good deal of time. Much of this time is spent in producing prototypes. Prototyping may require specialized apparatus and services which are not available in-house. Molds, tools, and dies are particularly difficult to obtain rapidly. Once a prototype is made, it is often necessary to make changes in the design and make another prototype. The present invention provides a method for rapid prototyping. As commonly used today, rapid prototyping refers simply to making a pattern or non-functional part. A non-functional article allows fit and form to be tested. It is considerably more difficult and time-consuming to make a prototype to test function, that is, which has the mechanical properties needed to test the article in its intended use. The DLF process is capable of producing a true rapid prototype, which can be used in a service test to investigate stresses, strains, fracture properties, and wear properties. After testing, the design of the article may be changed and another true prototype made and tested. This rapid reiteration provides an ability to optimize a design in a short period of time.

An article made by the DLF process has annealed properties, that is, its microstructure and metallurgical properties are similar to articles which have been annealed. If the material of a DLF article is heat-treatable, the properties of the article, such as strength, ductility, fracture toughness, and corrosion resistance, can be modified by means of heat treatment. An article formed by a conventional cold working process of a material having a large strain-hardening coefficient (such as austenitic stainless steel) will have relatively high strength compared to a DLF-formed article. Examples of cold working processes are forging and extrusion. If, however, a cold-formed article is subjected to the heat of welding, its strength will be reduced to that of annealed articles. Thus, DLF is an attractive alternative to fabrication by subtractive machining and welding, but cannot be substituted for processes in which a near net shape article is fabricated by cold-forming without welding and the high strength of cold-forming is required.

Following are descriptions of background patents.

U.S. Pat. No. 4,724,299 teaches a nozzle for cladding of an object using metal powder melted by a laser beam.

U.S. Pat. No. 5,111,021 deals with adding material to a surface using a laser beam and metal powder and discloses a nozzle for doing so.

U.S. Pat. No. 4,743,733 teaches repair of an article by directing a laser beam and a stream of metal powder to a region of the article which requires repair.

U.S. Pat. No. 4,323,756 teaches a method for producing metallic articles from metal powders and substrates which become part of the articles. A focused energy beam is used to create a molten pool on a substrate and metal powder is supplied to a point outside of the area at which the beam impinges upon the substrate. Movement of the substrate then carries the powder into the beam and molten pool, where it melts and mixes with the melted substrate material.

SUMMARY OF THE INVENTION

This invention is a deposition head for use as a part of apparatus for forming articles from materials in particulate form in which the materials are melted by a laser beam and deposited at points along a tool path to form an article of the desired shape and dimensions. The deposition head delivers the laser beam and powder to a deposition zone, which is formed at the tip of the deposition head. A controller comprised of a digital computer directs movement of the deposition zone along the tool path and provides control signals to adjust apparatus functions, such as the speed at which the deposition head moves along the tool path.

It is an object of this invention to provide apparatus for producing articles without use of molds, patterns, forming dies, or cutting tools.

Another object is to provide apparatus for producing articles having desirable mechanical properties, such as homogenous microstructure and high density.

Another object is to provide apparatus for producing near net shape articles without use of substractive machining methods.

Another object is to provide apparatus for rapid and low-cost production of one-of-a-kind or small number of articles.

In one embodiment, the invention is a deposition head comprised of a delivery nozzle and an optics package for focusing a laser beam at a location in a deposition zone, where said laser beam passes out of said optics package through a protective window, and where said delivery nozzle is comprised of a first end and a beam passage extending from said first end to a second end of said delivery nozzle, where said first end is attached to the optics package such that the laser beam passes through said beam passage and is focused at a location in said deposition zone, where the deposition zone is located adjacent to said second end of the nozzle; at least two powder inlet ports located at the first end of the nozzle; at least two powder passages, each having a first end which communicates with one of said powder inlet ports where each powder passage extends through the nozzle toward the deposition zone, where powder passages are arranged in pairs and a first passage of a pair is oriented about 180 degrees from a second passage of the pair, where the axial centerline of each powder passage forms an angle of from about 20 to about 75 degrees with the axial centerline of the nozzle, and where said axial centerlines converge in the deposition zone; a coolant inlet port and a coolant outlet port located at the first end of the nozzle; a coolant channel located inside the nozzle and extending circumferentially around the nozzle; a coolant inlet passage and a coolant outlet passage which connect said coolant inlet port and said coolant outlet port with said coolant channel; a lower window through which the laser beam passes which is disposed across the beam passage; a lower gas inlet port, a lower gas channel located within the nozzle and extending circumferentially around the nozzle, and a lower gas passage connecting said lower gas port and said lower gas channel; a plurality of gas pathways in the nozzle, each of which connects the lower gas channel with the beam passage, where said gas pathways are disposed about the beam passage adjacent to that surface of the lower window which is proximate to the second end of the nozzle; an upper gas inlet port and an upper gas inlet passage connecting said inlet port to the beam passage at a point between the protective window and the lower window; and an upper gas outlet port and an upper gas outlet passage connecting said outlet port to the beam passage at a point between the protective window and the lower window; and an upper gas outlet port and an upper gas outlet passage connecting said outlet port to the beam passage at a point between the protective window and the lower window.

DETAILED DESCRIPTION OF THE INVENTION

Figure 1:
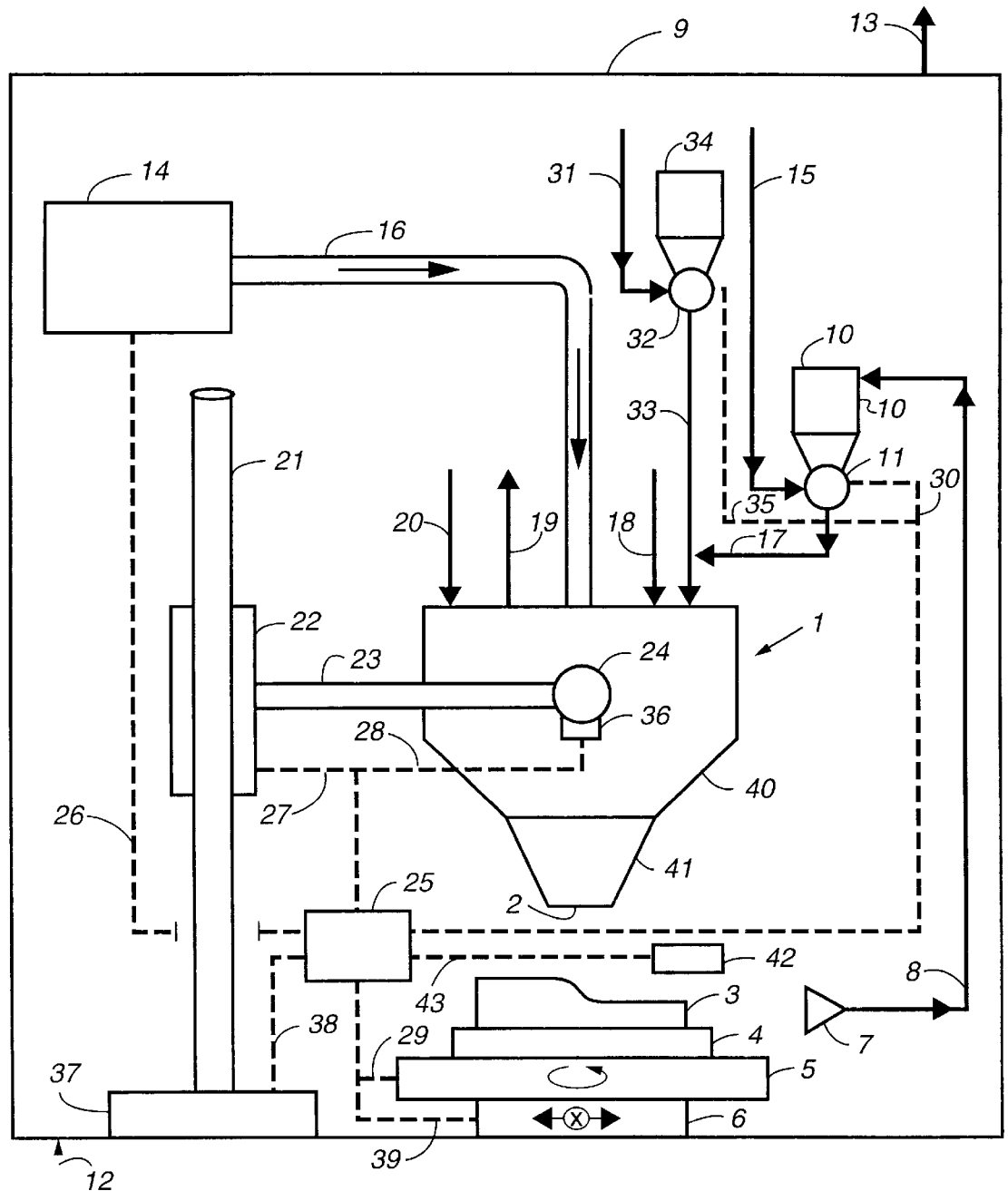
FIG. 1 is a schematic and functional representation of apparatus for producing an article of this invention.

An article is constructed by depositing molten material along a tool path which has been designed to yield the desired article shape and dimensions, where this molten material is formed from a powder, or solid particulate matter, which is supplied to points along the tool path and melted at those points. The term "tool path" is used herein because it is familiar to those skilled in the art of machining with CNC apparatus and similar apparatus is used in practice of the invention. To start fabrication of an article, laser light is focused at a point on an article support and a stream of particulate matter, or powder, is supplied to that point. A small portion of the article support is melted by the laser beam to form a molten pool. The powder is melted by heat generated when the laser light strikes the particles and by transfer of heat from the molten pool to the powder as powder impinges on the molten pool. After a small amount of material has been deposited, the molten pool is formed, in part, by re-melting the deposited material. The space containing and surrounding the molten pool, the laser spot, the "focal point" of the powder stream, the focal point of the laser beam, and that portion of the laser beam where energy density is great enough to melt material is termed the deposition zone.

The deposition zone is moved along the tool path, leaving behind deposits consisting of the powder which has been consolidated by melting and, then, solidification due to loss of heat to the surroundings. A first portion of the tool path is designed to provide a base portion of the article. The base portion consists of deposited material which is in contact with the article support. After deposition along the relatively small first portion of the tool path is complete, deposition is continued along a second portion of the tool path to complete production of the article. During this second step, the molten pool formed in the deposition zone consists of previous deposits and the powder supplied to the deposition zone. It is desirable that the molten pool be small, in order to minimize the energy requirement, facilitate control of the molten pool, and permit production of an article with tight dimensional tolerances. After deposition is complete, the article may be separated from the article support, since the support is not normally intended to be a part of the article produced by the inventive process. However, applications can be envisioned in which an article is designed to utilize the article support as part of the article.

Relative motion between the deposition zone and the article support or the portion of the article already formed is accomplished with apparatus similar to that used in CNC (computer numerically controlled) machining, where motion of a cutting tool is directed by a controller comprised of a digital computer which contains machine operating code, or an operation program, or a machine operating file. The tool path is usually designed, or constructed, by use of a digital computer and a number of computer programs. In one embodiment of the invention, an article can be considered to be a plurality of thin layers of deposited material. For example, in fabrication of a tube, or thin-walled hollow cylinder, the tool path can be viewed as a large number of circles. In one pass of a deposition zone, or one movement of the zone of 360 degrees around the perimeter of the tube, a tube with an outside diameter of 0.85 inch and a wall thickness of 0.075 inch was increased in height, or length, by 0.004 inch. The layer of material deposited in the pass was shaped as a ring having an outside diameter of 0.85 inch, an inside diameter of 0.775 inch, and a thickness, or height, of 0.004 inch. If it had been desired to fabricate a tube with a thicker wall, a second 360 degree deposition pass could have been done in the same horizontal plane to produce a wider ring.

The shape and dimensions of an article are determined by, in addition to the tool path, control commands which are established in conjunction with the design of the tool path. A controller adjusts speed of movement of the deposition zone, energy density of the laser beam, and rate of flow of powder into the deposition zone in accordance with these commands.

FIG. 1 depicts, in a functional manner, apparatus which may be used to practice the DLF process (some features of FIG. 1 are not available in the new apparatus described below). Referring to FIG. 1, article 3 is in the process of formation and rests upon support 4, which in turn rests upon rotary table 5. The rotary table rests on X-Y table 6. Table 6 may be viewed as movable both in a side-to-side direction and in a direction normal to the plane of the drawing. Article 3 (and substrate 4) may be rotated about a vertical axis of the article by means of rotary table 5. Deposition head 1 is mounted on arm 23 and is capable of rotation about a horizontal shaft depicted by reference number 24. The deposition head is comprised of delivery nozzle 41 and optics package 40. Arm 23 is attached to positioner 22, which is capable of movement up and down along post 21. Post 21 is capable of rotation about its vertical axis. (This rotation feature is not incorporated in the apparatus whose use is described herein.) Powder and a laser beam exit delivery nozzle 41 at its lower end at a location shown by reference number 2. Laser light is produced in laser generator 14 and provided to deposition head 1 by means of flexible fiber optic 16. Optics package 40, which is commercially available, focuses a laser beam (not shown) at a point within a deposition zone (not shown) located at article 3. Powder is provided to the deposition head from powder containers 10 and 34 by means of powder feeders 11 and 32 through conduits 17 and 33. The powder feeders are capable of providing a variable flow of powder. Carrier gas for delivery of powder is supplied to powder feeders 11 and 32 through conduits 15 and 31. Cooling water is provided to the delivery nozzle through conduit 20 and removed from the nozzle by means of conduit 19. An inert gas for use in protection of the windows through which the laser beam passes is supplied by conduit 18. The apparatus is enclosed within enclosure 9 and conduits 12 and 13 are provided to flow inert gas into the enclosure and to evacuate the enclosure. Powder pickup 7 collects powder which is discharged from delivery nozzle 1 but not melted. This powder is returned to powder container 10 for reuse by means of conduit 8.

Controller 25 provides control signals for operating the apparatus to produce an article. Control leads 29 and 39 depict the signals required to cause movement of the X-Y table and the rotary table. Control lead 38 provides a signal to actuator base 37 for control of rotation of post 21. The control signal for movement of delivery nozzle 1 in a vertical direction is provided to positioner 22 by control lead 27. Control lead 28 provides a signal to actuator 36, which causes the delivery nozzle to rotate about shaft 24. Commands to vary the power level of the laser beam and to turn the beam on and off are provided to laser generator 14 by control lead 26. Flow rate of powder is adjusted by controller 25 by means of control leads 30 and 35. Sensors, depicted by reference number 42, provide information on deposition head and article configuration to controller 25 by means of control lead 43. These sensors will be further described below.

Figure 2:
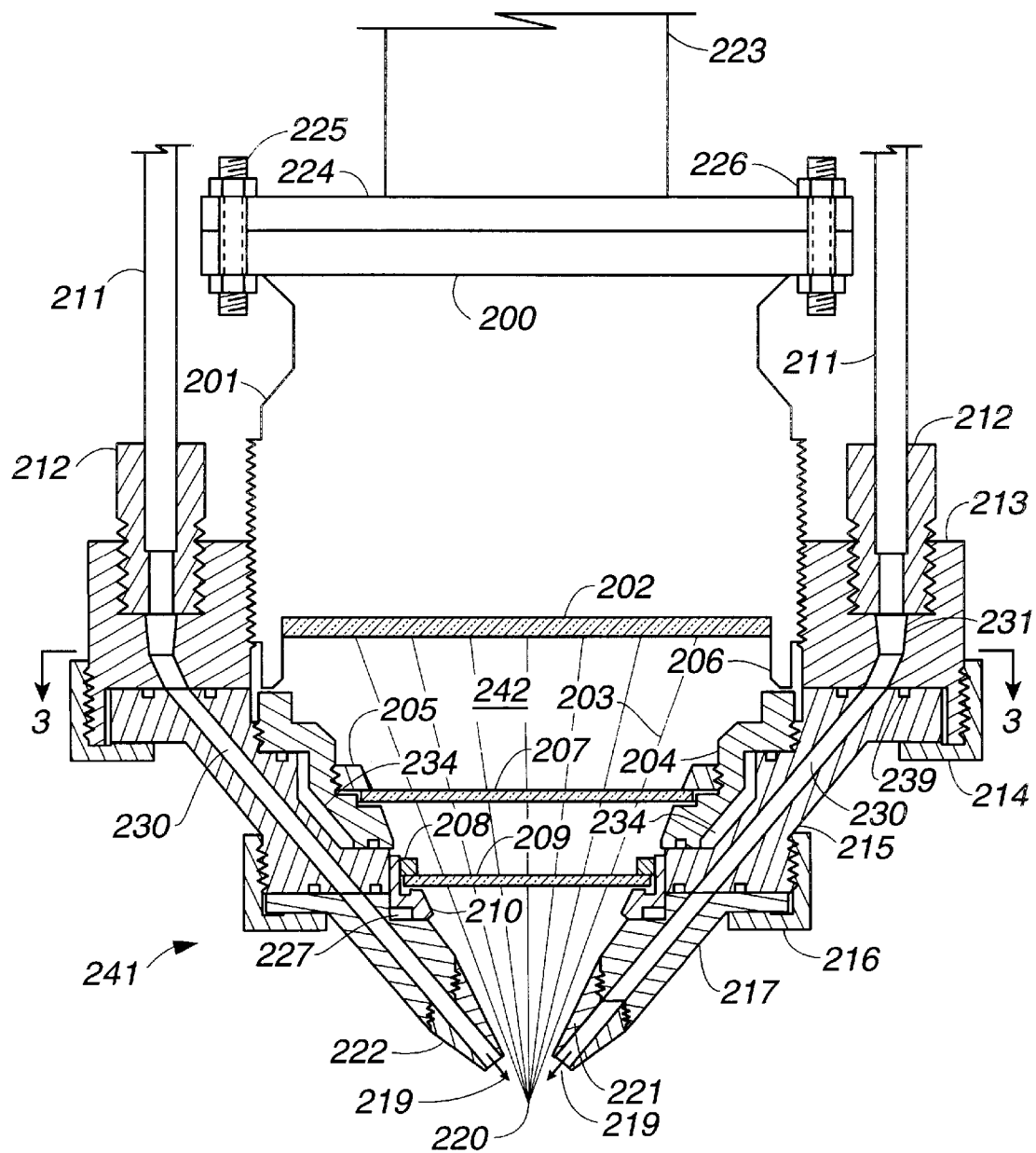
FIG. 2 depicts a delivery nozzle attached to an optics package in a vertical section view taken along the central axis of the nozzle.

FIG. 2 depicts a deposition head of this invention. The head is comprised of optics package 201 and delivery nozzle 241. The optics package is commercially available apparatus for receiving and focusing laser light and is mated to the delivery nozzle. Laser beam 203 passes through protective window 202 and beam passage 242 and is focused at the point denoted by reference number 220. Protective window 202 is supplied as a part of optics package 201. Optics package 201 is fastened to flange 224 by means of bolts and nuts (such as shown by reference numbers 225 and 226) disposed around the circumferences of flange 224 and flange 200, which is a part of the optics package. Element 223 connects the deposition head to the motion apparatus. The laser light passes through element 223 and into and through the optics package.

Outer element 215 of the delivery nozzle is attached to bulkhead ring 213 by means of upper clamp ring 214, which is threaded to the bulkhead ring. Extension 217 is attached to outer element 215 by means of lower clamp ring 216, which is threaded to the lower portion of outer element 215. Inner nozzle tip 221 and outer nozzle tip 222 are attached to extension 217 by means of screw threads. Inner element 204 is attached to outer element 215 by means of screw threads.

Figure 5:
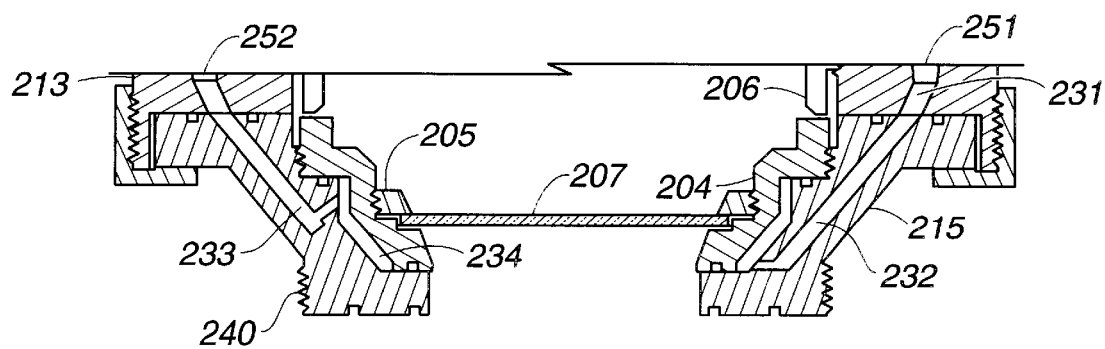
FIG. 5 is a vertical partial section view of a delivery nozzle taken as shown by section arrows of FIG. 3. It shows coolant passages.
Figure 6:
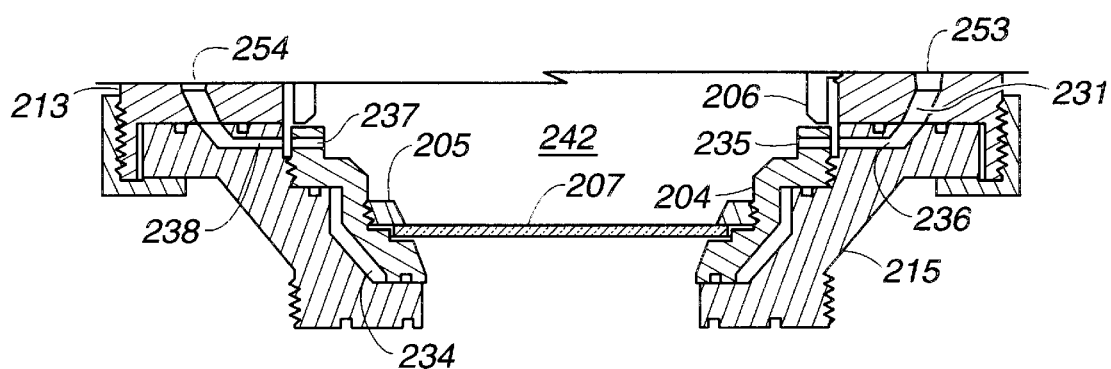
FIG. 6 is a vertical partial section view of a delivery nozzle taken as shown by section arrows of FIG. 3. It shows upper gas passages.
Figure 7:
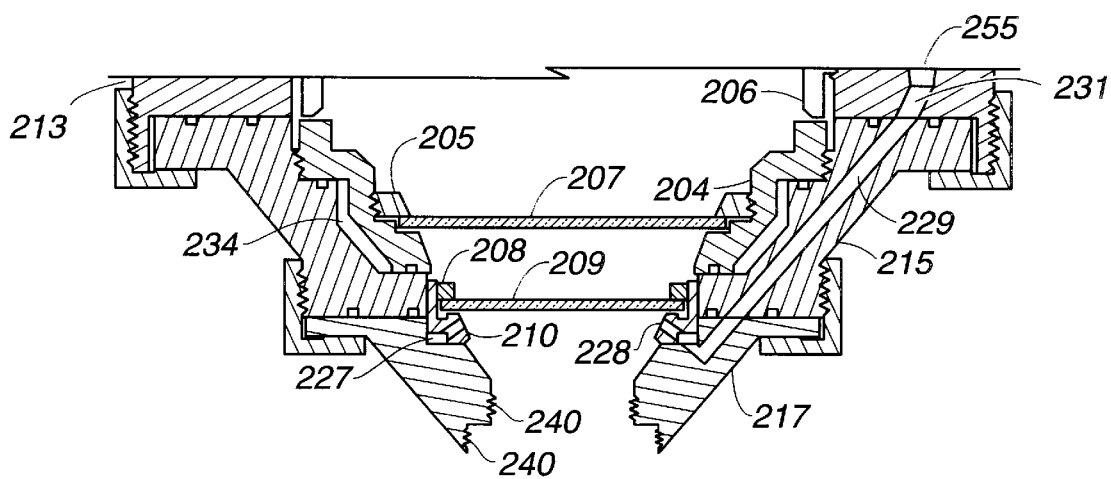
FIG. 7 is a vertical partial section view of a delivery nozzle taken as shown by section arrows of FIG. 3. It shows a lower gas passage.

Coolant channel 234 is defined by an outer surface of the inner element and an inner surface of the outer element and extends circumferentially around the nozzle. Water or another coolant is circulated through channel 234 in order to cool the deposition head. Coolant inlet and outlet passages are shown in FIG. 5. Lower gas channel 227 is in the shape of a ring or portion of a ring and is provided with gas as shown in FIG. 7. Also shown in FIG. 7 are passages for flow of gas into the beam passage. FIG. 6 shows passages for flow of gas into the beam passage. Gas is flowed into the deposition head to purge the beam passage of powder and other material, thereby protecting the deposition head. Lower window 209 is disposed across beam passage 242. The window is of quartz and serves to protect the optics package from heat, particulate matter, molten metal, etc. Lower window 209 rests in lower window housing 210 and is held in place by lower window retainer 208. Lower window housing 210 is retained in extension 217 by means of screw threads (not shown) located at the surface indicated by reference no. 243 in FIG. 4. Lower window retainer 208 has threads on its external circumferential surface (not shown) which engage threads in lower window housing 210 at the surface indicated by reference no. 244 of FIG. 4. Upper window 207 may be provided for the purpose of protecting the optics package in the event that the lower window becomes damaged. The upper window rests in inner element 204 and is held in place by upper window retainer 205, which has threads on its outer circumference which engage threads on the inner element. The terms upper window and lower window are used because these terms describe their positions when the deposition head is oriented as shown in FIG. 2, even though the head may be tilted during operation.

Powder is supplied to the deposition head by means of conduits 211, which are connected to bulkhead ring 213 by means of tubing fittings 212. The powder is transported by means of a flowing gas stream. The powder and its carrier gas flow through powder passages 230 and exit the delivery nozzle at its lower end, as depicted by arrows 219. Each powder passage begins in bulkhead ring 213 and passes through outer element 215, extension 217, and the tip of the delivery nozzle, which is formed by inner nozzle tip 221 and outer nozzle tip 222. Reference no. 231 denotes a flow channel in bulkhead ring 213. The channel so denoted is a part of powder passage 230. There are other flow channels in the bulkhead ring for powder, coolant, and gas, as described below. Reference no. 239 denotes an exemplary O-ring channel for retaining an O-ring (not shown) for purposes of sealing. Other O-ring channels are shown, but not numbered. Those skilled in the art are capable of providing such sealing means and other features, such as gaskets at the outer surfaces of the windows. Reference no. 206 denotes a portion of the optics package which is called out only because it appears in FIGS. 4–7.

Figure 3:
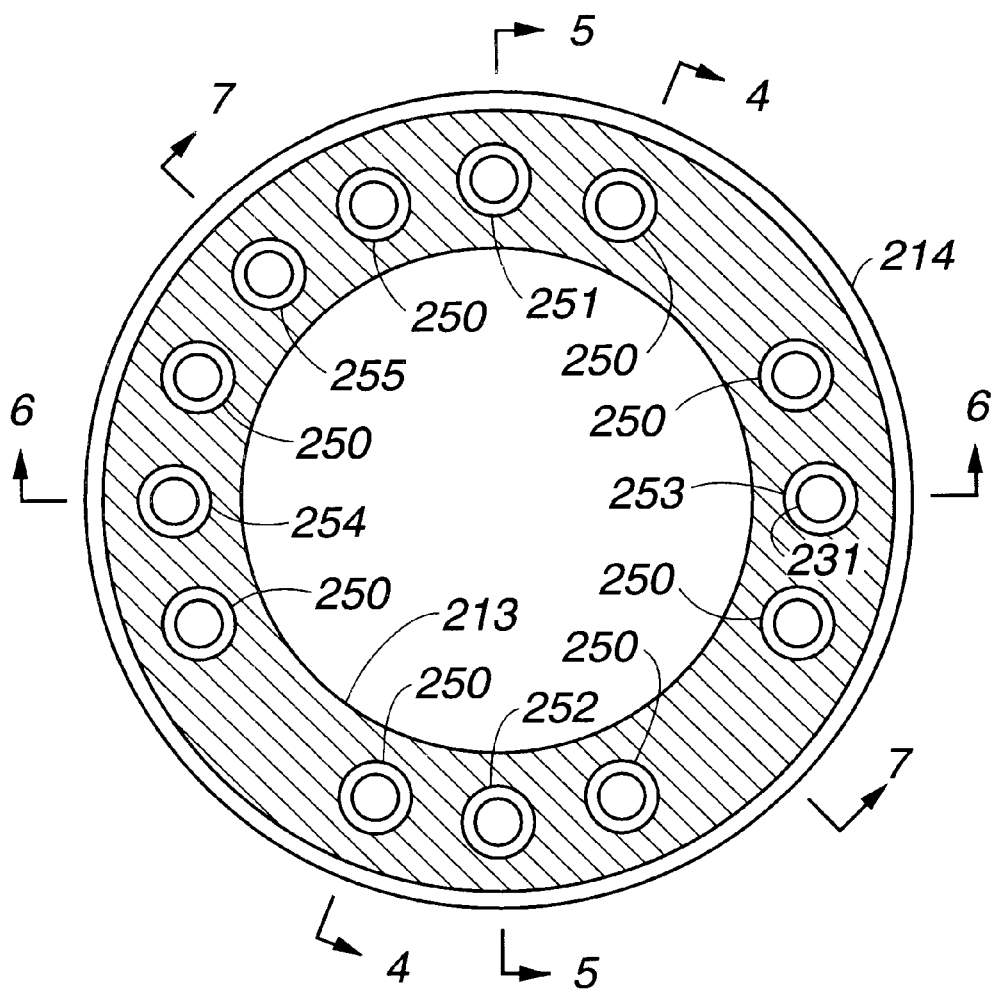
FIG. 3 is a section plan view taken as shown by the section arrows of FIG. 2. It shows powder passages.

FIGS. 4 through 7 depict that portion of the delivery nozzle below the section line for FIG. 3 which is shown in FIG. 2. The manner in which each section is taken is shown in FIG. 3, which is a plan view in section. Reference numbers are consistent with those of FIGS. 2 and 3 to permit correlations of elements from drawing to drawing.

FIG. 3 depicts inlet ports 250 through 255 in bulkhead ring 213. Clamp ring 214 is shown. Eight powder inlet ports denoted by reference no. 250 are shown. A powder conduit will be connected at each powder inlet port. A conduit carrying coolant will be connected to coolant inlet port 251. Coolant will leave the deposition head by means of a conduit connected to coolant outlet port 252. Gas is provided to the deposition head by means of conduits which will be connected to gas inlet ports 253 and 255. Gas is removed by means of gas outlet port 254. Flow channels pass through bulkhead ring 213, starting at each of the ports, as represented by reference no. 231.

Figure 4:
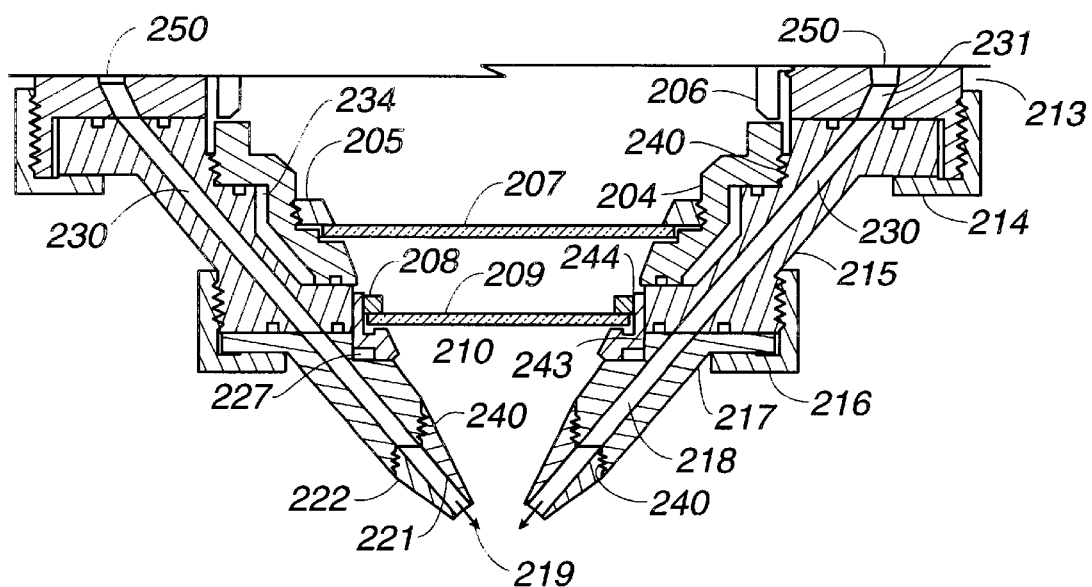
FIG. 4 is a vertical partial section view of a delivery nozzle taken as shown by section arrows of FIG. 3. It shows powder passages.

FIG. 4 shows powder passages 230, each of which extends from a powder inlet port 250 toward a deposition zone which surrounds laser beam focal point 220, as shown in FIG. 2. Inner nozzle tip 221 and outer nozzle tip 222 each have a hollow frustoconical configuration and are disposed such that a frustoconical annular space is formed between the outer surface of inner tip 221 and the inner surface of outer tip 222. The central axes of the laser beam passage, the inner tip, and the outer tip are coincident. The powder passages extend through the annular space, but are not defined within the annular space, that is, powder from the eight separate powder passages through extension 217 may mix in the annular space. The powder passages are disposed around the circumference of the nozzle and are provided in pairs, with one of each pair about 180 degrees from the other. It is not necessary that the passages be equally spaced, but it is highly desirable that they be provided in pairs to avoid biasing the growth of an article. At least two powder streams should be provided. Reference no. 240 depicts certain locations having screw threads. In some applications, it may be desirable to provide ribs on either the inner nozzle tip or outer nozzle tip to separate the powder passages from one another. This embodiment will permit variations in powder type and flow. For example, if 8 powder streams are used, 3 streams could provide one metal to the deposition zone while 5 streams provide another metal, thereby forming an alloy. Powder carrier gas pressure might be varied, with one or more streams having a higher pressure when the head is tilted in order to compensate for the gravitational effects of the differing orientation of the powder paths. A one-piece nozzle tip may be used instead of the two piece nozzle tip which is shown in FIG. 4; it could be attached by means of the threads used to attach inner nozzle tip 221. A one-piece nozzle tip might contain 2, 4, or more tubular powder passages. The powder pattern may be varied by providing a nozzle tip having powder passages which are not uniformly oriented in a conical manner, as depicted in FIG. 4. Powder passage angles may be varied.

FIG. 5 depicts coolant inlet passage 232, which provides coolant from a conduit attached to bulkhead ring 213 at coolant inlet port 251 to coolant channel 234. Coolant outlet passage 233 carries coolant away from the coolant channel to coolant outlet port 252.

FIG. 6 depicts upper gas channels. Gas flows into bulkhead ring 213 at gas inlet port 253 and passes through one of the flow channels 231, which is aligned with upper gas inlet channel 236 in outer element 215. Gas flows from upper gas inlet channel 236 through upper gas flow channel 235, which is a part of inner element 204, into beam passage 242. Gas flows out of the beam passage through upper gas flow channel 237 and upper gas outlet channel 238, exiting the nozzle at upper gas outlet port 254. The flow of gas through the space between protective window 202 and upper window 207, or the space between the protective window and lower window 209 if the upper window is not used, serves to protect the optics package.

FIG. 7 depicts lower gas passage 229, which extends from lower gas inlet port 255 through bulkhead ring 213 and outer element 215 into extension 217. Gas flows from gas passage 229 into lower gas channel 227, which distributes the gas to flow passages in lower window housing 210. Lower gas channel 227 extends entirely around or substantially around the nozzle in a circumferential manner in order to communicate with the gas flow passages. Reference no. 228 denotes one such passage. There are 5 additional passages (not shown) spaced around lower window housing 210, all of which connect with lower gas channel 227. The gas flow passages in the lower window housing are oriented such that gas flowing out of them impinges on the surface of the lower window which is proximate to the lower end of the nozzle. The gas exits the nozzle through the lower end of the beam passage. The purpose of the gas flow is to remove powder and other material from the lower window and aid in protection of the deposition head from heat, molten metal splatters, etc.

The delivery nozzle may be fabricated of any material suitable to withstand the heat produced by the laser beam. Stainless steel is one choice. The inner nozzle tip and outer nozzle tip, which are those parts of the nozzle closest to the molten metal of the deposition zone, may be fabricated of a metal or a machinable ceramic which has a high service temperature rating. One such ceramic is Macor (tradename), which is available from Corning Glass and is comprised of silicon dioxide, alumina, magnesium oxide, potassium oxide and several lesser compounds.

The powder, gas, and water passages of a prototype delivery nozzle have their central axes at an angle of about 40 degrees to the central axis of the beam passage, so that the total angle between powder streams leaving the annular space at the tip of the nozzle is about 80 degrees. Values of from about 20 to about 75 degrees may be used. The outer radius of the bulkhead ring of the prototype nozzle is about 2.45 in. (62.2 mm) and its thickness is about 1.2 in. (30.5 mm). The vertical height of the outer element is about 1.2 in. (30.9 mm) and that of extension 17 is about 0.7 in. (17.6 mm). The outer radius of the upper end of the inner element is about 1.58 in. (40.1 mm) and that of the lower end is 0.81 in. (20.5 mm). The inside radius of the inner nozzle tip at its upper end is about 0.42 in. (10.7 mm) and that of its lower end is 0.18 in. (4.6 mm). The outer surface of the inner nozzle tip is at an angle of about 50 degrees to the central axis of the nozzle, in comparison to the 40 degrees used in the upper portion of the nozzle. The inner surface of the outer nozzle tip is at an angle of 40 degrees to the axial centerline of the nozzle. The inner radius of the upper end of the outer nozzle tip is about 0.56 in. (14.3 mm) and that of the lower end is about 0.24 in. (6.1 mm).

Figure 8:
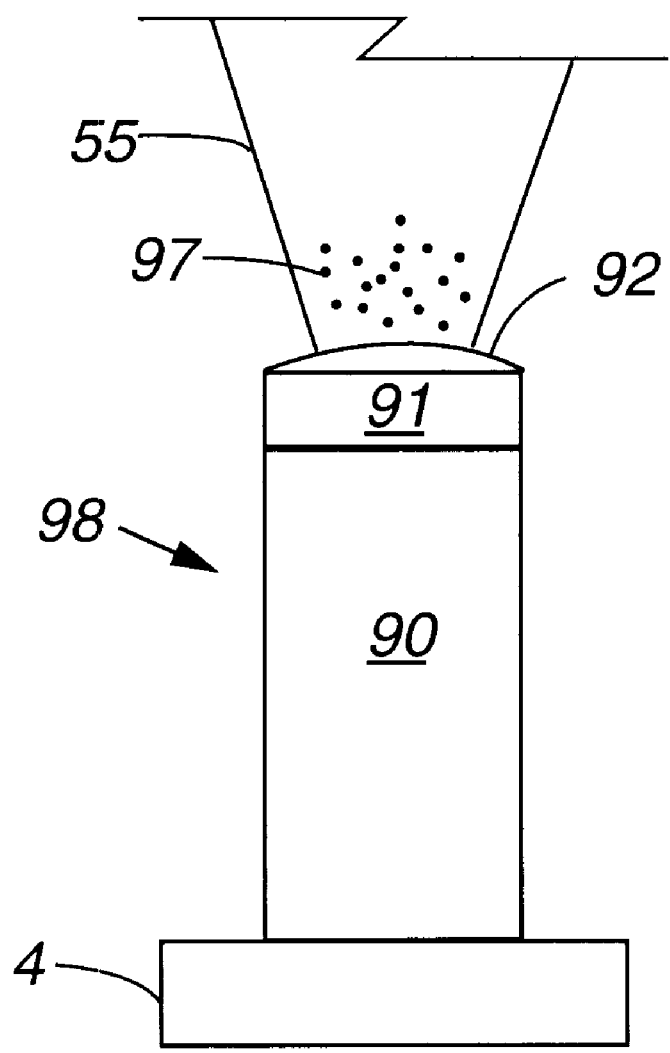
FIGS. 8 and 9 schematically depict articles which are in the process of formation.
Figure 9:
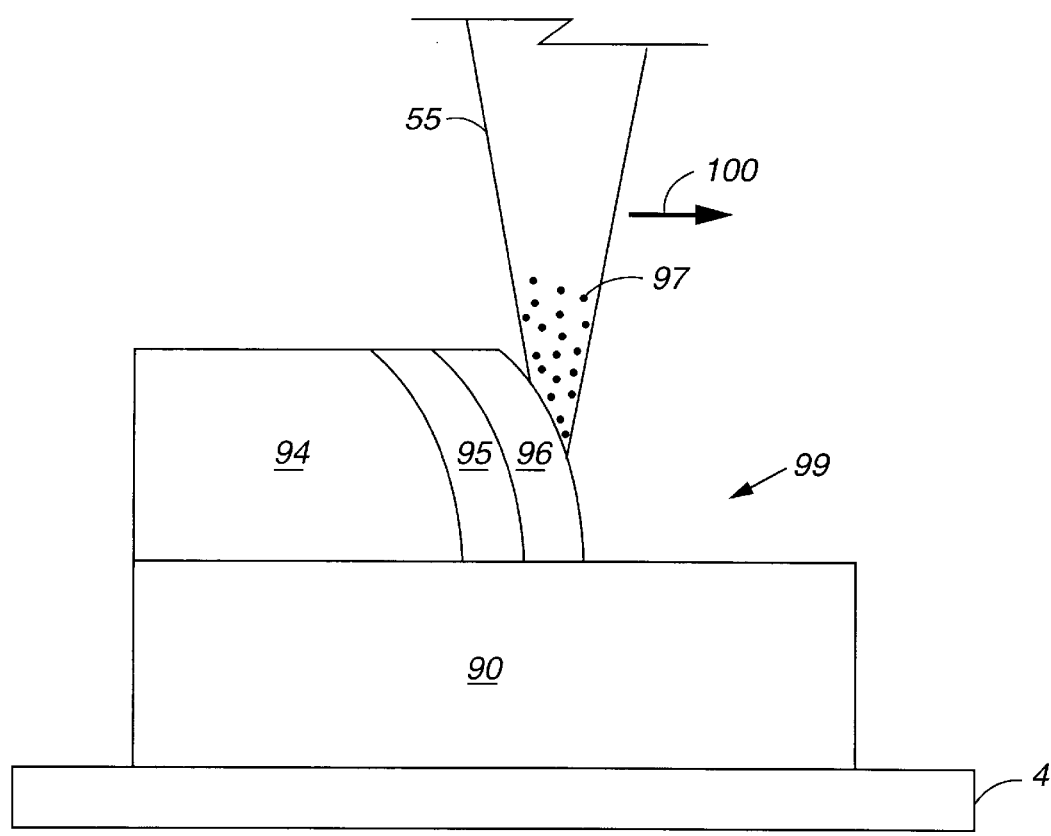

FIGS. 8 and 9 each depict an article which rests on support 4 and is in the process of formation by use of laser beam 55. Particulate matter, or powder, is represented as shown by reference number 97. FIG. 8 shows rod 98, which is made by moving the deposition zone only in a vertical direction. Rod 98 consists of solid zone 90, mushy zone 91, and liquid zone 92. The sizes of these zones, the laser beam, and the powder are for drawing convenience and are not intended to show size relationships. Mushy zone 91 is the transition space, where solid dendrites are growing, or solidifying, between the already solidified portion of the rod and the material which is liquid form. In FIG. 9, the first pass of the delivery nozzle produced solid portion 90 of article 99 and the second pass is in progress. The second pass has caused to be formed the portion of article 99 denoted by reference number 94, which portion has solidified. The direction of movement of the laser beam is to the right, as shown by arrow 100. Mushy zone 95 separates solid zone 94 from liquid zone 96.

Figure 10:
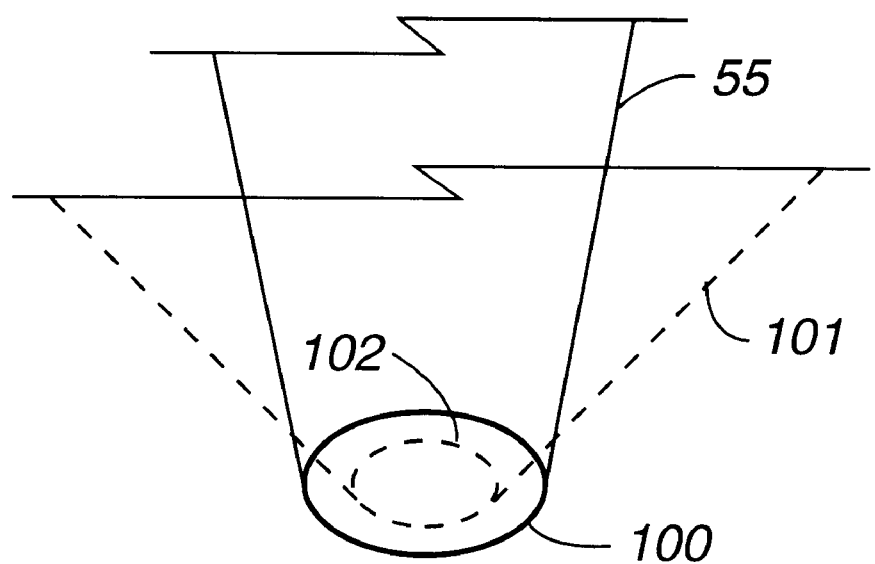
FIG. 10 depicts a laser beam and stream of powder. It is not to scale.

FIG. 10 depicts the end portion of a laser beam and powder stream when the deposition head is vertically oriented, that is, when its axial centerline is vertical. The exterior envelope of the generally conical beam is shown by reference number 55. Laser spot 100 is the pattern formed by laser light on a plane which is normal to the central axis of the beam and located at the article being formed. When the deposition head is operating in a position other than vertical, powder particle velocity should be increased, in order to overcome gravitational effects which may cause bending of the powder stream. The powder delivery spot 102 may assume an oval configuration and the center of the spot may not be coincident with the central axis of the delivery nozzle when the delivery nozzle of FIG. 2 is tilted. While it is convenient to visualize the laser beam as focused at a single point, available optical apparatus is not capable of accomplishing this, so the diameter of the laser spot has a minimum value fixed by the optics. The focal point is also termed the theoretical diffraction-limited spot. The size of the focal zone will normally be about 0.060 in. (1.5 mm) above and below the focal point. The deposition head may be positioned such that the laser spot may be located above, below or at the focal point. Maximum energy density of the beam is at the focal point and energy density is less at points on either side of the focal spot. Reference number 102 shows a powder delivery spot and dashed lines 101 indicate a conical delivery envelope for streams of powder converging in the deposition zone. However, it is not necessary to have such a uniform curtain of powder, but only that at least two streams of powder enter the deposition zone. These streams must converge within the deposition zone, that is, they must meet in the deposition zone. It is not necessary that all powder leaving the delivery nozzle enter the deposition zone. If only two streams of powder are used, they should enter the deposition zone at about 180° from one another to avoid biasing "growth" of the article being deposited toward the powder exit port of the delivery nozzle. It is preferable to use four or more powder paths entering the deposition zone at equally spaced points. In the case of four streams, it is preferable that they be spaced at about 90° apart. If the powder spot is larger than the laser spot, causing powder to accumulate around the article, this powder may be recovered and re-used. It is desirable to achieve a powder delivery spot which is equal to or smaller than the laser spot. This will minimize the quantity of powder for recycle and contribute to dimensional precision of the process.

Figure 11:
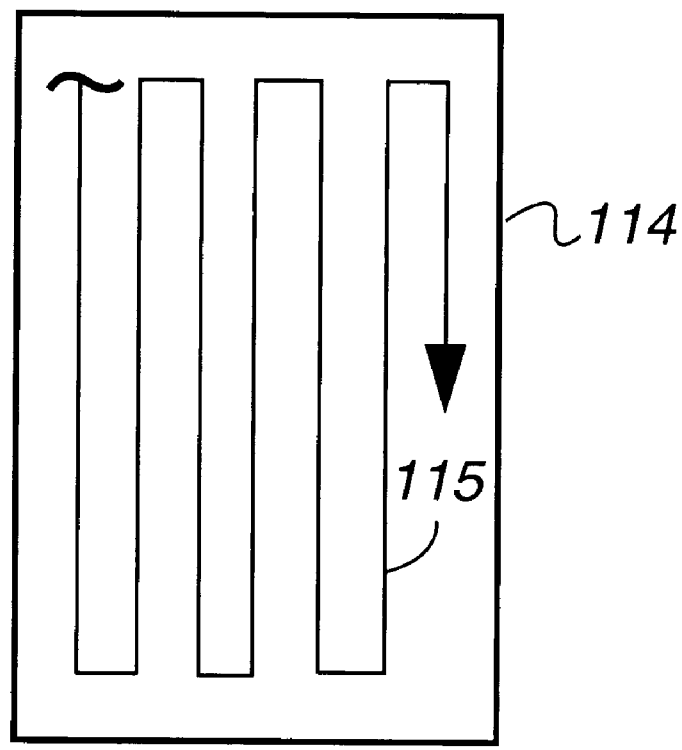
FIGS. 11 and 12 each depict a rectangular portion of an article and a portion of a tool path followed in producing the article. They are not to scale.
Figure 12:
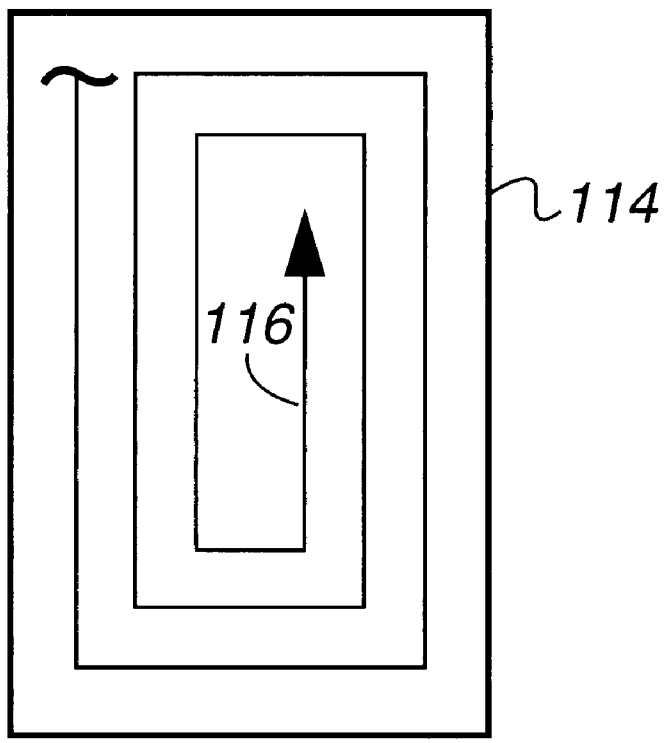

FIGS. 11 and 12 are top views of a portion of article 114, which has a rectangular cross-section. Portions of tool paths by which the article may be formed are shown by reference numbers 115 and 116. A layer of the article may be formed by a roughing pass following tool path 115 or 116 and then by a finishing pass which forms the outer portion of the layer. Alternatively, a finishing pass may create a shell and then the shell may be filled in with material using a roughing pass. In a roughing pass, operating parameters are established which maximize rate of material deposition, while parameters for a finishing pass are optimized for dimensional precision and surface finish.

The DLF molten pool is generally about 10% of the size of a molten pool obtained when doing TIG welding. Dimensional accuracy is improved by decreasing the size of the molten pool. Size of the molten pool is dependent upon such factors as laser beam power, absorptivity of the material being heated, and heat flow away from the pool.

A new laser deposition system which will utilize this invention is presently being constructed. Laser welding apparatus which is designated Lumonics MW2000 by the manufacturer is being incorporated into the new DLF system. This apparatus includes a 5 axis positioning system (designated Model 550) supplied by the Laserdyne Division of Lumonics Corp. of Livonia, Mich. A Laserdyne System 94 Controller will be used. The optics package component of the deposition head, which is capable of providing a laser spot having a diameter of 0.5 mm, is provided by Laserdyne. It is expected that the maximum deposition rate for the new system will be in excess of 2 g/sec. The new apparatus includes a Z-axis positioner to move the deposition head in a vertical direction and a table on which an article support is placed so that the support can be moved along the X-axis, along the Y-axis, and rotated about a vertical axis. The table will be cooled to prevent damage due to heat transferred to it during fabrication of an article. Cooling water will be circulated such that it contacts the lower surface of the top plate upon which rests a support for fabrication of an article. A circular trough will surround the table for collection of excess powder. During and after fabrication of an article, flow of powder may be discontinued while the powder carrier gas is left on and the deposition head moved so that excess powder is blown into the trough by the carrier gas. The table will be designed so that an article support or fixture or partially finished article can be placed on it or clamped to it. A fixture may be used to hold a support or partially finished article in a particular position chosen by a designer as optimum for fabrication of the article. An article may be manually repositioned at a particular point in its fabrication sequence.

Figure 13:
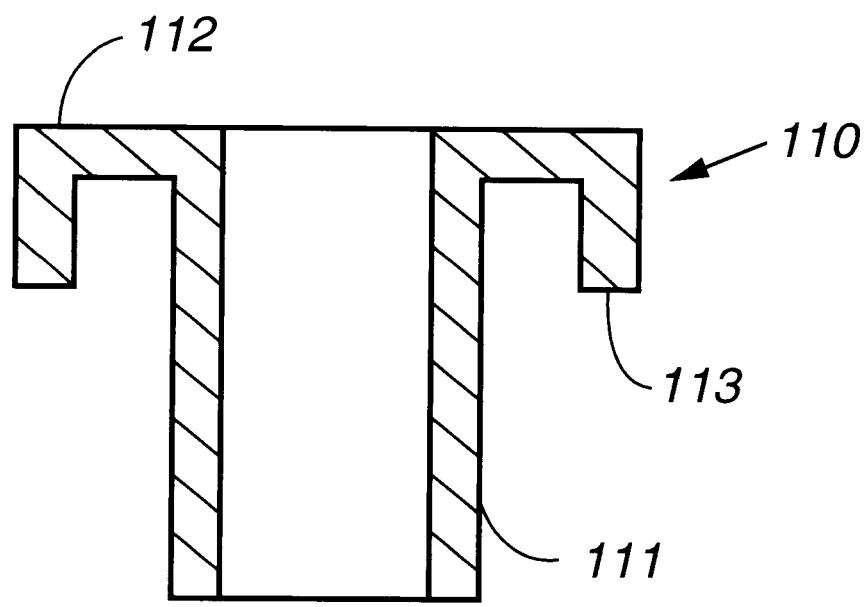
FIG. 13 is a vertical section view of an article which is presented to illustrate the capability of the present invention to produce articles having overhanging structures.

The deposition head of the new system will be mounted on apparatus which has the capability of rotating it 135 degrees from the vertical in each direction in a single plane, in the manner described in connection with FIG. 2. Thus, the new system will provide the capability of depositing material in a sideways direction and an upward direction, that is, on the bottom side of a feature of an article. This is illustrated by reference to FIG. 13, which is a sectional view of flange 110. First, the large vertical portion of the flange, denoted by reference number 111 is deposited with the delivery nozzle in a vertical or near vertical position so that the laser beam and powder stream are directed in a downward direction. Then, the delivery nozzle is rotated to produce the horizontal portion of the flange denoted by reference number 112. Lastly, the nozzle is rotated further, so that the laser beam and powder stream are directed upward at an angle of up to 45 degrees to the horizontal, in order to produce the overhanging vertical portion of the flange denoted by reference number 113. The normal deposition head orientation is such that the axial centerline of the head will pass through the center of the deposition zone. However, the new system has a higher power laser than the three-axis apparatus and may be operated with the laser head slightly tilted from this position, perhaps at a tilt angle of about 20°, to avoid reflection of light from the deposition zone into the laser delivery system. Such reflections may cause damage to optical components. It may be necessary to tilt the head when fabricating an article of aluminum, which is quite reflective, whereas a normal head orientation may be used for a stainless steel article, since SS is less reflective than Al.

The new system will utilize a 2 kw maximum continuous wave Nd-YAG laser having one lasing cavity with four lasing rods. Peak power in pulsed mode will be 5.4 kW. The generator will be capable of operation in a pulsed mode or with any degree of modulation. The laser light will be delivered to the deposition head by use of a fiber optic cable and mirrors.

Movement of the deposition zone and controlling functions such as powder feed rate could be done manually, but it is very difficult to achieve specific article dimensions when doing so. Attempts to manually grow articles were considered to be unsuccessful. Practically, it is necessary to utilize CNC machining motion apparatus to accomplish precise movement of the deposition zone. Such apparatus is normally sold with a controller which provides control signals to the motion apparatus which accomplishes relative motion between a workpiece and a cutting tool. A controller also provides other machine control commands. For example, to carry out a conventional machining operation of grooving an article, a CNC milling machine controller may be programmed so that it causes movement of the spindle of the machine, and thus the cutting tool contained in the spindle, downward from a starting location (this is termed a plunge) to a point near the edge of a flat plate, causes rotation of the spindle to start, and then causes movement of the tool along the X axis of the machine for a specified distance, thereby cutting a straight groove in the plate. After cutting the groove, the spindle may be moved upward (this is termed a retract) to its starting position or to another position in preparation for another plunge. Just before starting the cutting movement, the controller may provide a signal which causes a cutting fluid, or coolant, to start flowing to the location at which cutting is taking place. The milling machine controller may also have spare, or user-defined, control commands available so that the user may program the controller to send a voltage to a set of terminals at a particular point in the machining sequence. For example, if the machine does not have the capability for automatic changing of cutting tools, a spare command may be used to sound a buzzer to alert an operator to change the tool. The controller of a CNC milling machine is normally provided to a customer with software which a technician may use to program the controller. For example, in creating a machine operating program, the technician may add the lines of code "P102" and "M108". This, in accordance with the protocol established for the machine by its manufacturer, "tells" the machine to execute a plunge and then to turn on coolant flow at the point in the operating sequence at which the lines of code are located. The movements of the spindle are called "tool paths" and commands such as "coolant on" are referred to as being embedded in the tool paths. A simple machining sequence, such as the grooving operation described above, is easily created by a technician by use of the programming software. However, controllers of sophisticated CNC milling machines are usually provided by the user with machine operating code which is created by use of commercially available software, thus avoiding the laborious task of programming a sequence of motions and commands for the controller line-by-line.

The deposition head and article support of this invention are mounted on commercially available motion apparatus. Movements of the deposition head, article support, and control commands can be programmed into a controller in the same manner as if a cutting tool were mounted on the motion apparatus. In practice of this invention, the singular term "tool path" is used to refer to the total sum of the movement of the deposition zone required to produce an article. Also, terminology specific to CNC machining is used for purposes of convenience and clarity. For example, the laser deposition apparatus may be referred to as a machine. A preferred embodiment of this invention utilizes commercial software, though significant modifications to the software are made, to create electronic files which reside in a digital computer. It is more efficient to adapt CNC software for use in DLF than to create thousands of lines of machine code from scratch. The adaptation process generally will be carried out just once. Of course, a DLF sequence may be programmed line-by-line, using the machine commands provided by the machine supplier.

What is claimed is:

1. A deposition head comprised of a delivery nozzle and an optics package for focusing a laser beam at a location in a deposition zones where said laser beam passes out of said optics package through a protective window, and where said delivery nozzle is comprised of:

a. a first end and a beam passage extending from said first end to a second end of said delivery nozzle, where said first end is attached to the optics package such that the laser beam passes through said beam passage and is focused at a location in said deposition zone, where the deposition zone is located adjacent to said second end of the nozzle;
   b. at least two powder inlet ports located at the first end of the nozzle;
   c. at least two powder passages, each having a first end which communicates with one of said powder inlet ports, where each powder passage extends through the nozzle toward the deposition zone, where powder passages are arranged in pairs and a first passage of a pair is oriented about 180 degrees from a second passage of the pair, where the axial centerline of each powder passage forms an angle of from about 20 to about 75 degrees with the axial centerline of the nozzle, and where said axial centerlines converge in the deposition zone;
   d. a lower window through which the laser beam passes which is disposed across the beam passage;
   e. a coolant inlet passage and a coolant outlet passage which connect a coolant inlet port and a coolant outlet port with a coolant channel;
   f. a lower window through which the laser beam passes which is disposed across the beam passage;
   g. a lower gas inlet port, a lower gas channel located within the nozzle and extending circumferentially around the nozzle, and a lower gas passage connecting said lower gas port and said lower gas channel;
   h. a plurality of gas pathways in the nozzle, each of which connects the lower gas channel with the beam passage, where said gas pathways are disposed about the beam passage adjacent to that surface of the lower window which is proximate to the second end of the nozzle;
   i. an upper gas inlet port and an upper gas inlet passage connecting said inlet port to the beam passage at a point between the protective window and the lower window;
   j. an upper gas outlet port and an upper gas outlet passage connecting said outlet port to the beam passage at a point between the protective window and the lower window; and
   k. an upper gas outlet port and an upper gas outlet passage connecting said outlet port to the beam passage at a point between the protective window and the lower window.

2. A deposition head comprised of a delivery nozzle and an optics package for focusing a laser beam at a location in a deposition zone, where said laser beam passes out of said optics package through a protective window, and where said delivery nozzle is comprised of:

a. a first end and a beam passage extending from said first end to a second end of said delivery nozzle, where said first end is attached to the optics package such that the laser beam passes through said beam passage and is focused at a location in said deposition zone, where the deposition zone is located adjacent to said second end of said nozzle;
   b. at least two powder inlet ports located at the first end of said nozzle;
   c. at least two powder passages, each having a first end which communicates with one of said powder inlet ports, where each powder passage extends through said nozzle toward the deposition zone, where powder passages are arranged in pairs and a first passage of a pair is oriented about 180 degrees from a second passage of the pair, where the axial centerline of each powder passage forms an angle of from about 20 to about 75 degrees with the axial centerline of said nozzle and where said axial centerlines converge in the deposition zone;
   d. a lower window through which the laser beam passes which is disposed across the beam passage; and
   e. a means for flowing gas through said delivery nozzle, said means for flowing gas comprised of: a lower gas inlet port; a lower gas channel located within said nozzle and extending circumferentially around said nozzle; a lower gas passage connecting said lower gas port and said lower gas channel; and a plurality of gas pathways in said nozzle, each of which connects the lower gas channel with the beam passage, where said gas pathways are disposed about the beam passage adjacent to that surface of the lower window which is proximate to the second end of said nozzle.

3. The apparatus of claim 2 further comprised of a means for cooling the delivery nozzle.

4. The apparatus of claim 3 where said means for cooling the delivery nozzle is comprised of:

a. a coolant inlet port and a coolant outlet port located at the first end of said nozzle;
   b. a coolant channel located inside said nozzle and extending circumferentially around the nozzle; and
   c. a coolant inlet passage and a coolant outlet passage which connect said coolant inlet port and said coolant outlet port with said coolant channel.

5. A deposition head comprised of a delivery nozzle and an optics package for focusing a laser beam at a location in a deposition zone, where said laser beam passes out of said optics package through a protective window, and where said delivery nozzle is comprised of:

a. a first end and a beam passage extending from said first end to a second end of said delivery nozzle, where said first end is attached to the optics package such that the laser beam passes through said beam passage and is focused at a location in said deposition zone, where the deposition zone is located adjacent to said second end of said nozzle;
   b. at least two powder inlet ports located at the first end of said nozzle;
   c. at least two powder passages, each having a first end which communicates with one of said powder inlet ports, where each powder passage extends through said nozzle toward the deposition zone, where powder passages are arranged in pairs and a first passage of a pair is oriented about 180 degrees from a second passage of the pair, where the axial centerline of each powder passage forms an angle of from about 20 to about 75 degrees with the axial centerline of said nozzle and where said axial centerlines converge in the deposition zone;

d. a lower window through which the laser beam passes which is disposed across the beam passage; and e. a means for flowing gas through said delivery nozzle comprised of: an upper gas inlet port; an upper gas inlet passage connecting said inlet port to the beam passage at a point between the protective window and the lower window; and an upper gas outlet port and an upper gas outlet passage connecting said outlet port to the beam passage at a point between the protective window and the lower window.

6. The apparatus of claim 5 further comprised of a means for cooling the delivery nozzle.

7. The apparatus of claim 6 where said means for cooling the delivery nozzle is comprised of:

a. a coolant inlet port and a coolant outlet port located at the first end of said nozzle;

b. a coolant channel located inside said nozzle and extending circumferentially around the nozzle; and c. a coolant inlet passage and a coolant outlet passage which connect said coolant inlet port and said coolant outlet port with said coolant channel.

\* \* \* \* \*